Feb. 21, 1928.

E. L. OLIVER 1,659,699

ROTARY FILTER

Filed April 4, 1922     3 Sheets-Sheet 1

INVENTOR.
Edwin Letts Oliver.
BY
Carlos P. Griffin
ATTORNEY.

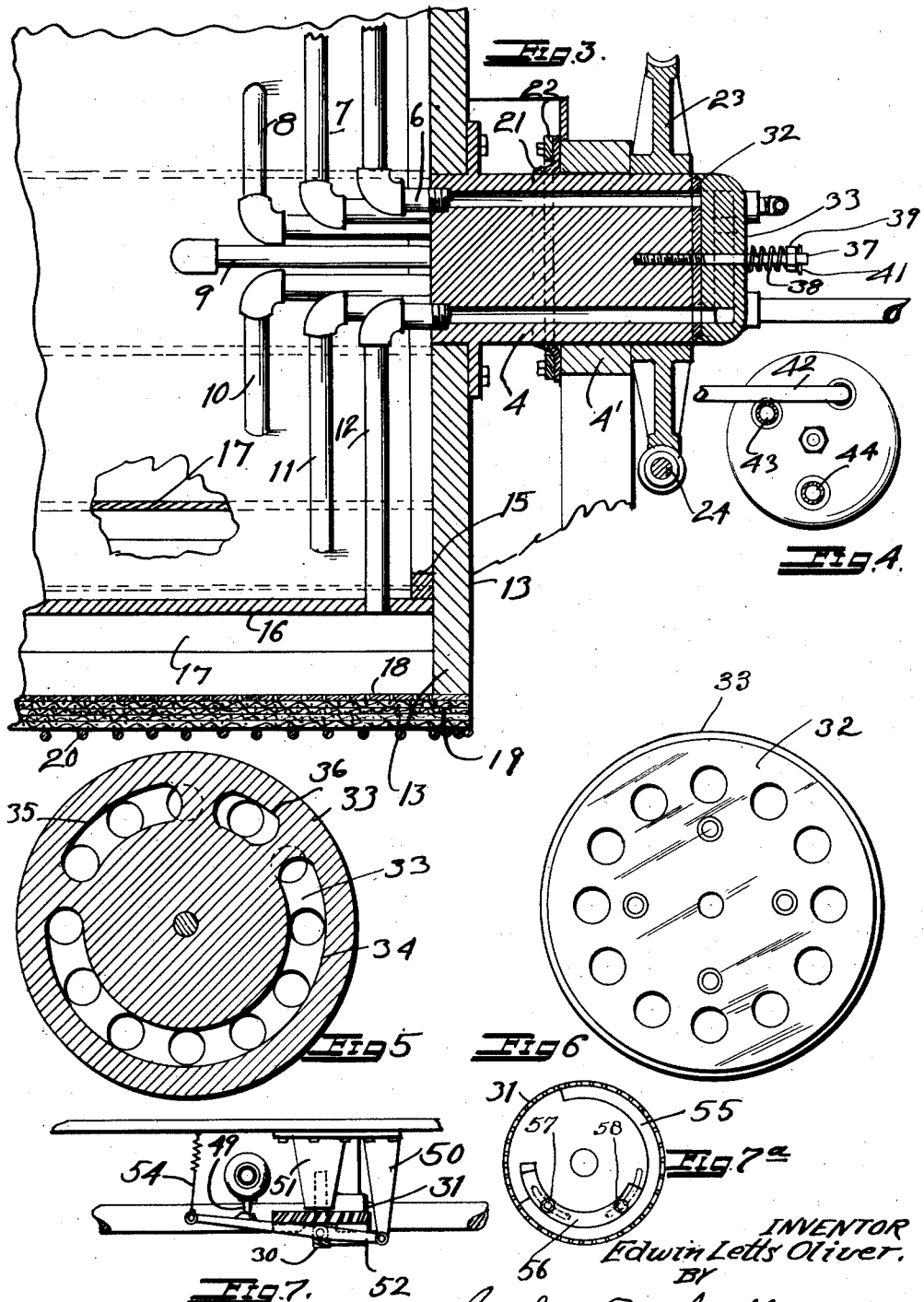

Feb. 21, 1928.  1,659,699

E. L. OLIVER

ROTARY FILTER

Filed April 4, 1922  3 Sheets-Sheet 3

INVENTOR.
Edwin Letts Oliver.
BY
Carlos P. Griffin
ATTORNEY.

Patented Feb. 21, 1928.

1,659,699

UNITED STATES PATENT OFFICE.

EDWIN LETTS OLIVER, OF OAKLAND, CALIFORNIA, ASSIGNOR TO OLIVER CONTINUOUS FILTER COMPANY, OF SAN FRANCISCO, CALIFORNIA, A CORPORATION OF CALIFORNIA.

ROTARY FILTER.

Application filed April 4, 1922. Serial No. 549,378.

This invention relates to a filter used for reducing the liquid contents of bodies of liquid containing solid particles which will not readily precipitate therefrom.

It will be understood by those skilled in the art that in carrying out the operations of industrial chemistry there are produced many mixtures of exceedingly finely divided materials with water, solutions or liquids of different kinds from which the liquids are to be removed either hot or cold. These operations are sometimes aided with air above or below atmospheric pressure; or steam may be used; or if an inert gas is required it may be used to supply the difference in pressure to cause the desired filtration to take place with the required commercial rapidity.

Since the filter drum must pass through the material to be filtered and collected for a considerable period of time, it is necessary to remove the cake from the filter septum as quickly as possible and it is also necessary to provide means to open the discharge pressure valve as quickly as possible to avoid the undesirable results of slowly applying the desired pressure of steam or air.

Another object of the invention is to provide means for supporting the agitator which will allow it to swing back and forth under the filter without having its bearings submerged.

Another object of the invention is to remove two solutions from the filter, one a filtrate, the other a washing solution, thereby avoiding the reduction in strength of the first filtrate.

Another object of the invention is to provide a support for the agitator which will not have the bearings submerged, while at the same time it will move in a path near enough to a true circle not to interfere with the drum operation. This type of bearing is a substitute for the true circle bearing surrounding the drum bearing and is a great improvement thereover because of the considerable size required on the part of said bearing because of the series of pipes connected to it. A large filter has a drum trunnion about 21 inches in diameter.

Another object of the invention is to produce an agitator of a convenient form which will direct the material stirred up by its movement toward the filter septum.

Other objects of the invention will appear as the description proceeds.

An embodiment of the invention is shown in the accompanying drawings in which the same reference numeral is applied to the same portion throughout, but I am aware that there may be modifications thereof.

Fig. 3 is an enlarged view of a portion of one end of the filter drum and one trunnion.

Fig. 4 is an end view of the drum trunnion.

Fig. 5 is a sectional view of the valve to which the vacuum and pressure pipes are connected which distribute the pressure to the filter sections.

Fig. 6 is an end view of the plate which is secured on the end of the drum hub to avoid the necessity of closely machining the hub.

Fig. 7 is a plan view of the blow timer.

Fig. 7ª is an enlarged view of the blow timing gear.

Figure 1:
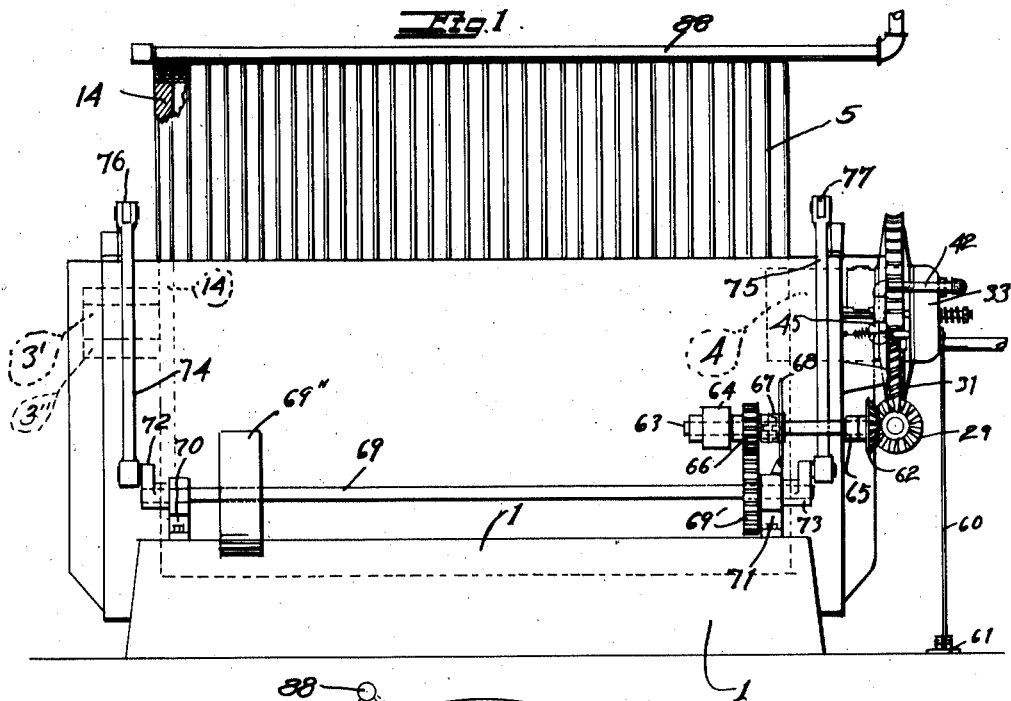
Fig. 1 is a side elevation of the complete filter.
Figure 2:
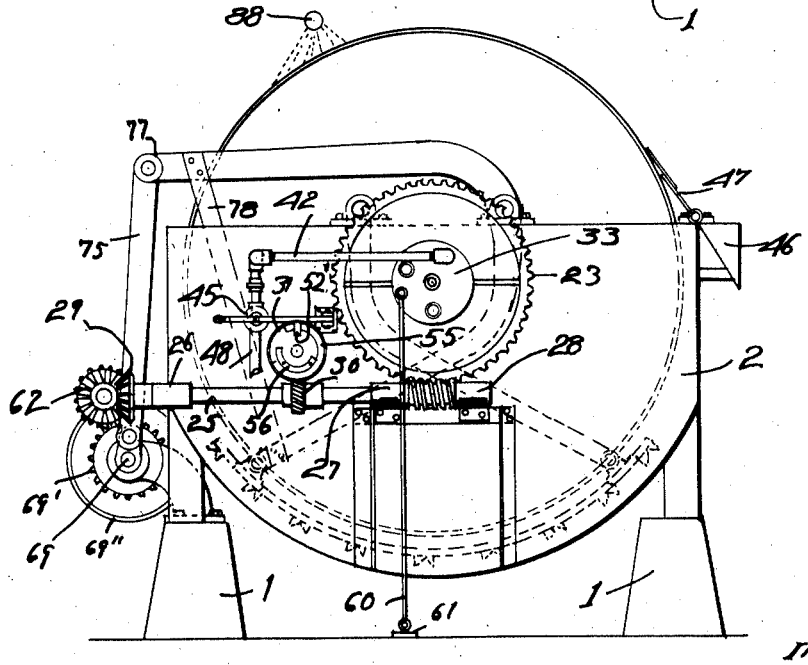
Fig. 2 is an end view of the filter.
Figure 8:
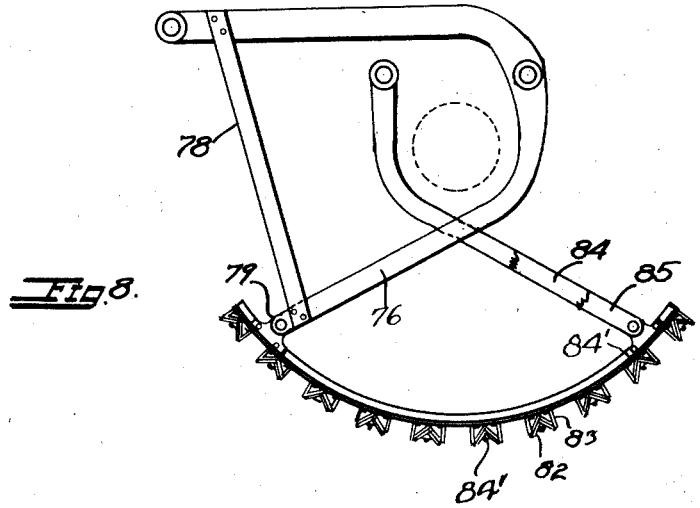

Fig. 8 is an end view of the agitator separate from the tank.

Figure 9:
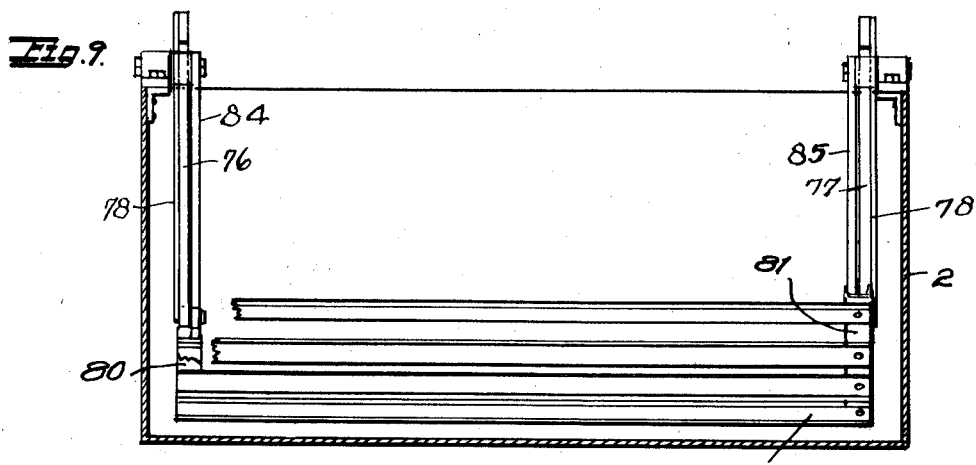
Figure 10:
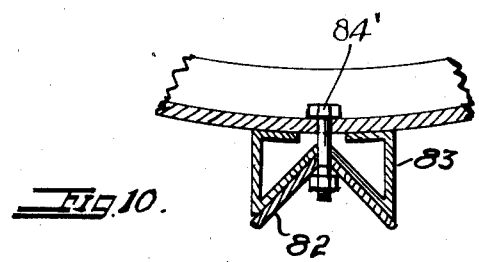

Fig. 9 is a side elevation of the agitator, the tank being shown in section, and Fig. 10 is a sectional view of one of the agitator bars and its support.

The numeral 1 indicates the foundations for the tank 2 which is supported thereon.

Within the tank there is a filter drum 5 supported on trunnions 3' and 4, the latter of which has a plurality of holes cast therein into which the pipes 6 to 12, shown in Figure 3, and five other similar pipes (not shown) extend to the several filter compartments. In the present filter there are twelve holes in the hub and these are each connected to the pipes extending to the twelve filter compartments.

The filter drum consists of two end members 13 and 14 each provided with a flange 15 to support the inner portion 16 of the several filter compartments. The compartments extend longitudinally the entire length of the drum and have partitions 17 to determine their angular extent. The filter septum comprises a foraminated supporting plate 18 secured to the drum ends 13, 14 and to the partitions covered with several layers 19 of any desired filter fabric. The fabric then has a wire 20 wound around the same to hold it from being blown off the drum when pressure is applied inside the same.

The trunnions 3' and 4 rotate in bearings 3'' and 4' the latter of which is prevented from leaking by any packing such as the rubber or leather gasket 21 held in place by the ring 22. The trunnion 4 has the worm wheel 23 in mesh with the worm 24 and by which the drum is slowly rotated.

The worm wheel 24 is carried by a shaft 25 mounted in three bearings on the end of the tank as shown at 26, 27, 28. This shaft 25 is driven by a bevel gear 29 and it has a spiral gear 30 to drive the timing gear 31.

The end of the trunnion 4 is trued up to receive a plate 32 made of an antifriction material which moves therewith and faced to make an air tight fit with the inner side of the valve 33 and which valve and facing is held in a fixed position by the rod 60. The valve has three concentric slots 34, 35, 36 placed to successively uncover the holes in the plate 32 of which there are the same number as the compartments of the filter and holes in the trunnion 4. The valve member 33 is held centered by the bolt 37 screwed into the trunnion 4 and it also holds the valve member 33 against the plate by means of the spring 38, washer 39 and cotter pin 41.

The valve has three pipes 42, 43 and 44 connected thereto. The pipe 42 is connected to a valve 45 for blowing the cake off the filter septum. The pipes 43, 44 are connected to suitable vacuum pumps to deliver the filtrate to any desired place of storage.

At the back of the tank there is a launder 46 to receive the cake scraped off by the blade 47 which rests on the wire windings.

The valve 45 is connected to the blow pipe 48 and it is of a common type of valve opened by pressure on the stem 49. A bracket 50 supports a lever 52 which is pulled against the valve stem 49 by the spring 54, said spring causing the valve 45 to open whenever the cams 55 or 56 are disengaged from the lug 52'. A bracket 51 forms the bearing for the shaft of the spiral gear 31 which gear has a fixed cam 55 on its side against which a depending lug 52' on the lever 52 bears. A cam 56 adjustable peripherally by means of the two bolts 57, 58 determines the time the blow valve 45 will be permitted to remain open on each compartment. It will be observed that the cams 55 and 56 alternately engage the lug 52' to open or close the blow valve 45, and since the cam 56 is adjustable peripherally, the time of the opening and closing of said valve may be varied in accordance with the position of the cam 56.

The spiral gear 31 is arranged to run twelve times as rapidly as the drum so as to give one turn of the gear for each complete movement of each compartment from one position to its next adjacent position, whereby a better regulation of the blow valve 45 is attained. A rod 60 extends from the valve 33 to a support 61 to prevent the valve from rotating with the drum trunnion 4.

The bevel gear 29 is in mesh with a bevel gear 62 on a shaft 63 journaled in two bearings 64, 65, the latter an extension of the bearing 26.

The shaft 63 has a gear 66 with a clutch hub adapted to be engaged by the slidable clutch member 67 manipulated with the lever 68 to stop the drum at will.

The drive shaft 69 is journaled in two bearings 70, 71 on the foundation block 1. The shaft 69 has cranks 72, 73 at its ends to which the links 74, 75 are connected which links are connected at their upper ends to the agitator arms 76, 77.

The agitator arms 76, 77 are shaped like the letter U and have a connecting brace 78 while they are pivotally mounted on the tank 2 at the bottom of the U. One end of the U is connected to the links 74, 75, while the other end of the U is pivotally connected at 79 to the agitator frame which latter consists of two curved angle bars 80, 81, connected by means of a plurality of angle bars 82.

The angle bars 82 are so placed as to scrape the deposited material toward the filter septum and they rest in an M-shaped fixture 83 at each end and are secured to the curved bars by bolts 84' passing through the bars 82 and fixture 83. It will be seen that the angle bars 82 are placed with their corners upwardly by the M-shaped fixtures 83, see Figure 10. This causes the material collecting on the bottom of the tank to be lifted upwardly over the inclined sides of said angle bars towards the septum of the revoluble filter as the agitator is oscillated.

At the other end the curved links 80, 81 are pivotally connected to two links 84, 85 which are pivoted to the tank on the opposite side of the trunnions 3 and 4 from the pivots of the supports for the opposite edge of the agitator.

The links 76, 77, and 84, 85 are so curved as to allow them the necessary movement toward and away from the trunnions 3 and 4, and though the agitator frame does not move in a true circle it moves in a sufficiently close approximation thereto not to interfere with the drum, and the relative movement at the submerged pivot points is so little that there is no appreciable wear thereof. The greatest pivot movement is at the upper pivots of the agitator and as these bearings are not submerged they can be easily kept lubricated.

The drum 5 is operated as deeply submerged as may be desired consistent with the usual requirement of also applying some kind of a wash spray through the pipe 88 to the cake on the filter septum prior to its discharge therefrom.

The position of the valve 33 determines the time of operation of the lowered pressure to the compartments submerged as well as to the compartments being washed, and the position of the gear 31 and its adjustable cam 56 determines the time of application and duration of the period of blow just prior to the removal of the cake by the blade 47.

A gear 69' on the shaft 69 enables that shaft to drive the gear 66 and shaft 63.

In operation power is applied by a suitable belt to the pulley 69" which shaft directly oscillates the agitators. At the same time the drum 5 is rotated and filtrate is drawn through the pipes in the submerged section by the effect of the lowered pressure in the pipe 44. When the filter septum passes out of the tank the spray from the pipe 88 is made heavy enough to be entirely taken up before any runs off the cake into the tank 2 and is taken away from the filter through the pipe 43. As the drum passes on the timing gear 31 will release the blow valve for a predetermined time just before the given section reaches the scraper blade thereby loosening the cake from the filter surface. The lifted cake is then scraped off and the filter is then ready for another submergence.

The agitator is movable on its supporting links 76, 77 and 84, 85 from two axes above the surface of the liquid in the filter tank 2, the object being to reduce the size of the bearing used, since in a large filter the end trunnions are about 24 inches in diameter, and to place the bearings for said supporting arms in a position to be kept cleaner than they could be if trunnions of the filter are used as the axial support. This support does not given the scraper a true circular path but it is sufficiently close to it to allow a very small distance between the drum and tank whereby both are beneficially acted on by the scraper movement.

What I claim is as follows but various modifications may be made in the construction shown in the drawings and above particularly described form, within the purview of my invention.

1. In a filter the combination of a fluid receptacle, a rotary filter therein having a plurality of compartments, means to take two kinds of filtrate from the filter, a blow valve, pipes connecting said valve and the filter, a cam revoluble more rapidly than the filter to snap said valve open on a compartment of the filter upon which a cake of material has collected, and a scraper for completing the removal of the cake.

2. In a filter the combination of a rotary filter having a plurality of compartments, means to apply pressure below atmospheric to the several filter compartments in succession to collect a cake of material thereon, a blow valve, pipes connecting said valve with certain of the filter compartments, and a cam revoluble more rapidly than the filter to snap the valve open to apply pressure in the filter to loosen the cake collected on one of the filter compartments.

3. In a filter, the combination of a fluid receptacle, a filter revoluble therein, means to draw a liquid from the filter to collect a cake on the septum thereof, an agitator under the filter, double axes carried by the receptacle to swing the agitator in a substantially circular movement, means to rotate the filter, and means to oscillate the agitator.

4. In a filter the combination of a fluid receptacle, a filter revoluble therein, means to draw a liquid from the lower portion of the filter to collect a cake of material on the filter, means to wash the cake formed after it leaves the fluid receptacle, means to draw the washing liquid through the cake after it is placed thereon, an agitator under the filter, means to pivotly support said agitator from two parallel axes above the submergence of the filter to give the agitator a movement substantially concentric with the filter surface, and means to oscillate the agitator and rotate the filter.

5. In a filter the combination of a fluid receptacle, a filter revoluble therein, means to draw a liquid from the lower portion of the filter to collect a cake thereon, an agitator under the filter, a pair of pivots at each end of the filter, supports extending from said pivots to opposite sides of the agitator, the pivots and supports being arranged to give the agitator a substantially circular movement, means to remove the cake from the filter, means to oscillate the agitator and rotate the filter, a revoluble cam to determine the timing of the filter operation, and an adjustable cam to vary the timing of the filter operation.

6. In a filter the combination of a fluid receptacle, a revoluble filter having a plurality of sections therein, means to draw a liquid from the lower portion of the filter, means to place a wash liquid upon the filter cake after the filter has emerged from the fluid in said receptacle, means to draw the wash liquid through a cake to clean the same, a timing valve, a blow valve, a revoluble adjustable cam to determine the operation of the blow valve pipes extending from the blow valve to the timing valve to permit the application of pressure to the inside of certain sections of the filter, means to snap the blow valve open to loosen the cake, and means to scrape the cake off the filter after it has been loosened.

7. In a filter the combination of a fluid receptacle, a revoluble filter having a plurality of sections therein, means to draw a liquid from the filter to collect a cake thereon, a timing valve, a blow valve, a revoluble adjustable cam to determine the operation of the blow valve pipes connecting the blow valve to the timing valve to permit pressure to be applied to certain of the filter sections during its rotation, a timing gear adapted to rotate through a complete cycle with each movement of a filter section past a given point, and an adjustable cam thereon for determining the time and extent of operation of the blow valve.

In testimony whereof I have hereunto set my hand this 23d day of March A. D. 1922.

EDWIN LETTS OLIVER.